United States Patent

Bracou et al.

[11] Patent Number: 5,965,784
[45] Date of Patent: *Oct. 12, 1999

[54] PROCESS AND APPARATUS FOR EXTRACTING AROMATIC COMPOUNDS CONTAINED IN A HYDROCARBON FEEDSTOCK

[75] Inventors: Hervé Bracou; Luc Gouzien, both of Le Havre, France

[73] Assignee: Total Raffinage Distribution S.A., Puteaux, France

[*] Notice: This patent issued on a continued prosecution application filed under 37 CFR 1.53(d), and is subject to the twenty year patent term provisions of 35 U.S.C. 154(a)(2).

[21] Appl. No.: 08/710,228

[22] Filed: Sep. 12, 1996

[30] Foreign Application Priority Data

Sep. 12, 1995 [FR] France .................................. 95.10671

[51] Int. Cl.⁶ ............................. C07C 7/10; C07C 7/17; C10G 21/16; C10G 21/04

[52] U.S. Cl. ......................... 585/834; 585/833; 585/864; 585/856; 585/857; 585/863; 208/311; 208/317; 208/318; 208/322; 208/326; 208/327

[58] Field of Search ..................... 585/833, 834, 585/864, 856, 857, 863; 208/311, 317, 318, 322, 326, 327

[56] References Cited

U.S. PATENT DOCUMENTS

| | | | |
|---|---|---|---|
| 3,979,281 | 9/1976 | Gerhold ................................. | 208/311 |
| 4,336,106 | 6/1982 | Winter, III ........................... | 196/14.52 |
| 4,532,086 | 7/1985 | Pluss ..................................... | 261/94 |
| 4,686,089 | 8/1987 | Haberland .............................. | 422/159 |
| 4,732,685 | 3/1988 | Brandt et al. .......................... | 210/634 |
| 4,869,809 | 9/1989 | Sarna ..................................... | 208/311 |
| 5,059,306 | 10/1991 | Kramer et al. ......................... | 208/313 |
| 5,328,596 | 7/1994 | Gammie, II ............................ | 208/321 |

FOREIGN PATENT DOCUMENTS

| | | | |
|---|---|---|---|
| A-2 190 510 | 2/1974 | France ............................... | B01J 1/00 |
| A-2 315 300 | 1/1977 | France ............................... | B01D 11/00 |
| A-2 577 820 | 8/1986 | France ............................... | B01D 11/04 |
| U-85 29 714 | 1/1986 | Germany .......................... | B01D 11/04 |
| A-1 556 410 | 11/1979 | United Kingdom ............ | B01D 11/04 |

OTHER PUBLICATIONS

The English translation of Sulzer's Article, Feb. 15, 1995.

*Primary Examiner*—Walter D. Griffin
*Assistant Examiner*—Thuan D Dang
*Attorney, Agent, or Firm*—Frommer Lawrence & Haug LLP; A. Thomas S. Safford; Thomas J. Kowalski

[57] ABSTRACT

An extraction process and an apparatus for separating aromatic compounds contained in a liquid hydrocarbon feedstock where the feedstock feed into the lower part of an extraction column is brought into intimate countercurrent contact therein with a third liquid and at least partially with at least one structured packing element (31) of the static mixer type contained in the upper part of the extraction column. Such third liquid (feed to the top of said column) is in the form of a solvent which is immiscible with the feedstock except for being capable of extracting the aromatic compounds. At least part of the extract phase rich in solvent and aromatic compounds is separated by liquid—liquid separation (26), preferably by gravity type decantation, into a phase rich in solvent and essentially depleted of raffinate, which is removed, and a phase rich in raffinate and impoverished in solvent, which is recycled to the extraction step. The extraction process is typically to be used to formulate lubricant oils.

7 Claims, 2 Drawing Sheets

PROCESS AND APPARATUS FOR EXTRACTING AROMATIC COMPOUNDS CONTAINED IN A HYDROCARBON FEEDSTOCK

RELATED APPLICATION

This application claims priority to French Application No. 95 10671, filed Sep. 12, 1996, incorporated herein by reference.

FIELD OF THE INVENTION

The present invention concerns an improved process and an improved apparatus for extracting aromatic compounds contained in a hydrocarbon feedstock whereby said feedstock in the liquid phase is brought into intimate countercurrent contact with a third liquid solvent (liquid—liquid extraction).

More particularly, the invention relates to the extraction of aromatic compounds contained in feedstocks that are subsequently used either to formulate lubricant oils or to formulate gas oils.

BACKGROUND OF THE INVENTION

The extraction process which comprises contacting the feedstock to be treated, in liquid phase, with a third, countercurrently circulating solvent, also in the liquid phase. This is a well-known industrial operation and is intended to ensure the transfer of one or more feedstock solutes to an immiscible phase, namely the third liquid solvent. This results in two phases: an extract phase (solvent and solute) and a raffinate phase (feedstock freed of a major part of solute).

Such a process is used, in particular, to eliminate the aromatic compounds present in feedstocks used to formulate lubricant oils. This is because said oils must show only minor variations in viscosity with temperature, and the aromatic compounds show highly variable viscosity. Moreover, the aromatic compounds are sensitive to oxidation and can cause coke formation by polycondensation.

In general, the solvent and the feedstock to be treated are made to circulate countercurrently in an extraction column. The solvent which is heavier than the feedstock is introduced at the upper part, and the feedstock at the lower part, of the column. A raffinate phase, impoverished in aromatic compounds stemming from the original feedstock, and small quantities of solvent are collected at the top, and an extract phase containing a major part of the solvent and the dissolved aromatic compounds stemming from the original feedstock is collected at the bottom of the column.

BRIEF DESCRIPTION OF THE DRAWINGS

In this specification and in the accompanying drawings, some preferred embodiments of the invention are shown and described and various alternatives and modifications thereof have been suggested; but it is to be understood that other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE PRIOR ART

Figure 1:
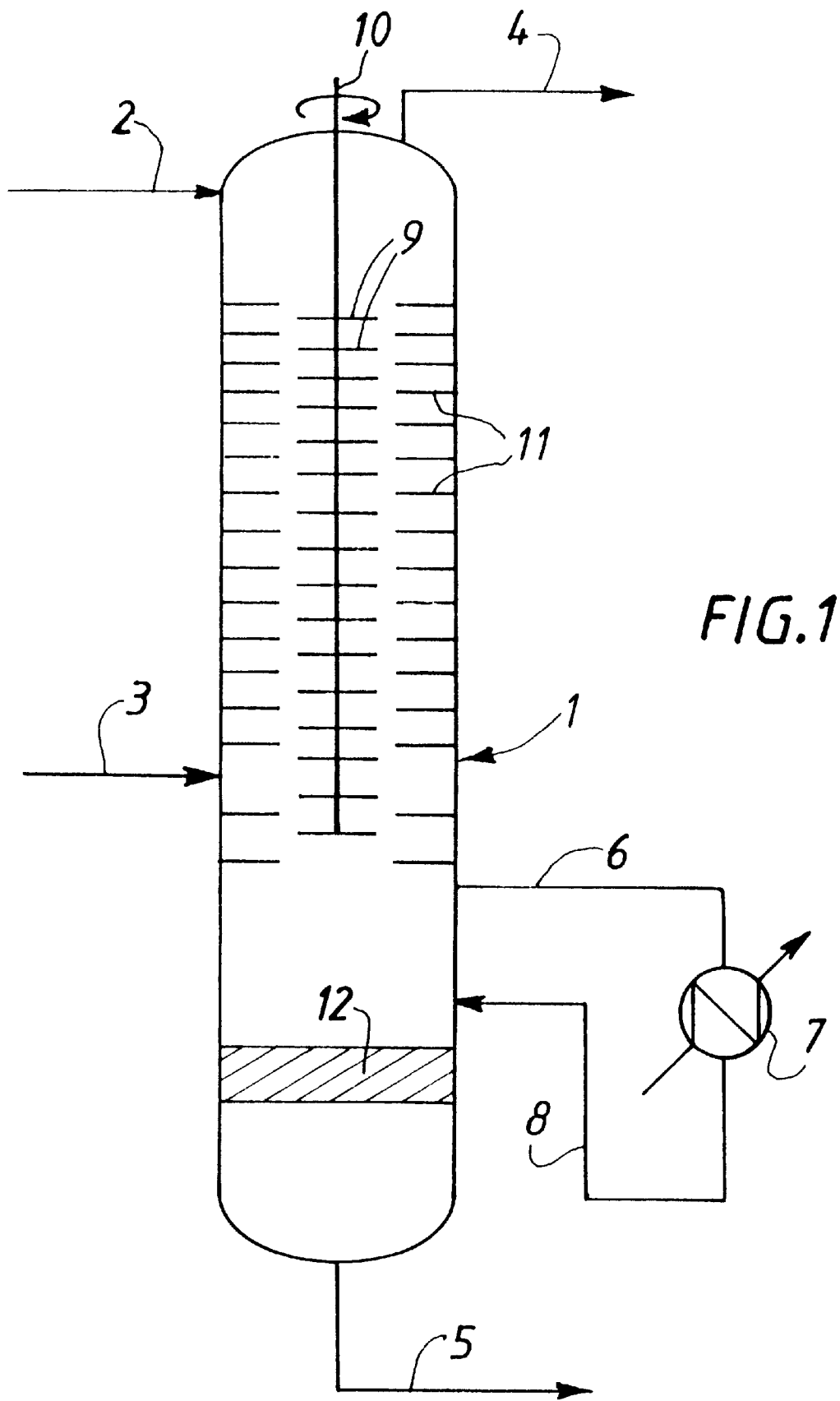
FIG. 1 is a schematic drawing of a prior-art column for extracting aromatic compounds from a feedstock that is subsequently used to formulate lubricant oils.

In the case of prior-art extraction column 1, shown in FIG. 1, the solvent is introduced through line 2 at the top of the column, whereas the feedstock to be treated is injected through line 3 into the provided packing structure at the lower part of said column at a distance from the bottom substantially equal to one third of the height of the column. In general, the solvent has a density greater than 1 kg/L and in the case of furfural, for example, equal to 1.16 kg/L, whereas the feedstock in the case of a vacuum distillate has a density of less than or equal to, for example, about 0.92 kg/L. The solvent constitutes the continuous phase and the feedstock constitutes the dispersed phase. Phase separation thus occurs in the upper part of column 1.

The raffinate phase, used as lubricant base, is recovered at the top of the column through line 4, whereas the extract phase is removed at the bottom of the column through line 5. The solvent contained in each phase is then recovered in a separation step and recycled to the extraction unit.

The selectivity of the solvent used (furfural, N-methylpyrrolidone [NMP], phenol, dimethyl sulfoxide [DMSO], dimethylformamide [DMF] or others) is generally insufficient at ambient temperature; hence, the extraction must be carried out at a temperature above ambient temperature, for example between 80 and 140° C. in the case of furfural and between 70 and 110 ° C. in the case of NMP.

For example, in the case of furfural, the feedstock is usually introduced at about 85° C. at a specific flow rate of about 4.5 to 8.5 $m^3/h/m^2$, whereas the solvent is introduced at the top of the column at a temperature higher than that of the feedstock and sufficient to maintain the top of the column at the level required to ensure the quality of the raffinate. This choice of temperature is essential, because the miscibility of the two phases increases with temperature. Thus, while maintaining a high temperature at the top of the column to improve selectivity and to meet raffinate specifications, a first temperature gradient favorable for the transfer of the light phase contained in the continuous phase is created between the two feeding zones contributing to an increase in the raffinate/feedstock extraction yield.

The specific flow rate of furfural is about 14.5 to 18.5 $m^3/h/m^2$, corresponding to a solvent proportion or ratio of solvent flow rate to feedstock flow rate of 1.70 to 4.10 vol./vol. and to a maximum total specific flow rate (hydraulic capacity of the extractor) of 23 $m^3/h/m^2$.

Moreover, a temperature gradient is also present at the bottom of the column. To create this gradient, part of the continuous phase is removed laterally through line 6, cooled by making it pass through heat exchanger 7 and recycled through line 8 to the lower part of the column. In this manner, a greater second temperature gradient is established at the bottom of the column which, like the first temperature gradient, contributes to the transfer of the light phase contained in the continuous phase. Thus, the extract phase is impoverished in drops of the raffinate phase, which contributes to an increase in the raffinate/feedstock ratio.

For the other solvents, the operating conditions (specific flow rates and temperatures) are selected as functions of their intrinsic properties and of the raffinate quality desired.

In general, the feedstocks used to formulate lubricant oils contain from 50 to 75% of aromatic compounds and, after extraction, the raffinates obtained contain from 35 to 55% of aromatics. For the feedstocks used to formulate gas oils, the aromatics content is from 25 to 35% and, after extraction, the raffinates obtained contain from 10 to 20% of aromatics.

In the upper part of the column, at two-thirds of the column height, are provided internal structures consisting of axially centered immobile disks 9 and rings 11 integral with the side walls of the column.

The internal structures of the column keep the feedstock dispersed in the third liquid solvent. The intensity of mass transfer of the feedstock solute or solutes to the solvent is inversely proportional to the size of the drops of the light phase dispersed in the continuous phase. Hence, to promote maximum mass transfer, the formation of small drops is maintained.

Small drops, however, present problems from insufficient coalescence, particularly in systems with low interfacial tension. Hence, a risk exists that some of the drops of the dispersed light phase will be entrained by the continuous phase. Moreover, this risk grows with the specific flow rates of the solvent and the feedstock.

To alleviate this drawback, what in the industry is known as a coalescence mat 12 consisting, for example, of a coiled mesh which promotes collisions between drops and, hence, their coalescence, is usually disposed under recycle line 8, thus limiting the entrainment of the light phase dispersed in the continuous phase.

The residence time of the continuous phase in the lower part of column 1, below coalescence mat 12, is generally greater than 15 minutes and preferably from 20 to 30 minutes, which makes it possible to eliminate practically the entire dispersed light phase that was able to pass through mat 12.

The above-described technique presents certain disadvantages. In particular, axial channeling can be observed between the plates and the disks. This phenomenon is even more pronounced in large-size columns and interferes with the optimum transfer of aromatic compounds to the solvent. Moreover, the transverse mixing of the two phases between the plates and the disks is relatively weak which also interferes with good mass transfer between the two phases.

Another apparatus similar to the one described hereinabove but whose disks 9 rotate and are driven by a driving shaft disposed along the column axis has been proposed for the extraction of aromatic compounds contained in a hydrocarbon feedstock. The action of the rotating disks brings about better transverse mixing than in the preceding case.

Axial mixing, however, appears to be excessive and detrimental to optimum mass transfer of one phase to the other. In particular, the formation of small dispersed drops causes a decrease in the flow rate of the feedstock thus limiting the treatment capacity of the extraction column.

Moreover, this apparatus with rotating disks is of complex design and difficult to use. In particular, this type of apparatus poses serious maintenance problems, particularly in the maintenance of bearings.

Another drawback of these two types of apparatus lies in the nonuniform progression of the phases inside the extraction column which is essentially due to back-mixing. Moreover, the axial transmission factor of the internal structures of the ring and disk type is low, about 25%, which limits the total specific flow rate value.

OBJECTS OF THE INVENTION

An object of the present invention is to alleviate the drawbacks described hereinabove (by substituting, according to the present invention, in the upper part of the column, a stationary packing of the static mixer type for the ring and immobile or rotating disks of the prior art).

Another object of the present invention is to increase the treatment capacity of the extraction columns (by promoting, according to the present invention, intimate contact between the solvent and the feedstock and the separation of the drops of the raffinate phase dispersed as an emulsion in the extract phase).

Finally, a further object of the present invention is to homogenize the residence time of the feedstock in the extraction column so that the residence time of each drop of feedstock will be close to the average residence time of all drops of the feedstock.

SUMMARY OF THE INVENTION

To this end, the present invention is embodied by a process for extracting aromatic compounds from a hydrocarbon feedstock by bringing said feedstock into intimate countercurrent contact with a third liquid solvent immiscible with the feedstock and capable of extracting the aromatic compounds, the phase separation producing a raffinate phase impoverished in aromatic compounds and an extract phase rich in solvent and aromatic compounds, said process being characterized by the fact that (a) the feedstock is brought into intimate countercurrent contact with a third liquid solvent at least in part in the presence of at least one structured packing element of the static mixer type, and (b) at least part of the extract phase rich in solvent and aromatic compounds is separated by liquid—liquid separation into a solvent-rich phase essentially depleted of raffinate, which is removed, and a phase rich in raffinate and impoverished in solvent, which is recycled to the extraction.

According to a further preferred embodiment of the invention, the flow rate of the third liquid solvent is greater than that of the feedstock. In this case, the third liquid solvent serves as continuous phase wherein the drops of feedstock are dispersed in the form of an emulsion.

Another aspect of the invention is embodied by an apparatus for extracting aromatic compounds from a hydrocarbon feedstock by bringing said feedstock in countercurrent contact with a third liquid solvent immiscible with the feedstock and capable of extracting the aromatic compounds, said apparatus comprising an extraction column at the upper part of which the third liquid solvent is introduced, the feedstock to be treated being introduced into the lower part of the column, a line for removing the raffinate phase being provided in the upper part of the column and a line for removing the extract phase being provided at the lower part of the column, said apparatus being characterized in that (a) at least one structured packing element of the static mixer type occupies at least part of the internal volume of the column that separates the levels at which the solvent and the feedstock are introduced; and (b) the line for removing the extract phase is connected to liquid—liquid separation means external to the column, said separation means being equipped with at least one outlet means for a phase rich in solvent and aromatic compounds and impoverished in raffinate and, at the lower part of the column, a recycling means for a phase enriched in raffinate and impoverished in solvent.

Static mixers are currently being used in distillation columns and are described, for example, in U.S. Pat. No. 4,532,086 and French Patent No. 2,577,820 (and the latter's equivalent U.S. Pat. No. 4,686,089).

Surprisingly, applicants have found that such static mixers, used in extraction columns of the type indicated hereinabove, promote in a major way the turbulence of the medium and, hence, intimate contact between the continuous solvent phase and the light phase consisting of the feedstocks which after extraction of the aromatics are to be used to formulate lubricant oils or gas oils.

In the extractive units according to the invention, the specific flow rate of the feedstock and that of the solvent are clearly greater than those permitted for a conventional installation of the same size. More precisely, according to tests performed, the specific flow rate of the feedstock is 4–5 times greater than that for a conventional installation, and the specific flow rate of the solvent is 4–5 times greater than that for a conventional installation, which corresponds to a total specific flow rate of up to 120 $m^3/h/m^2$, depending on the feedstock and the solvent.

This results in a marked increase in treatment capacity of the extraction unit for a raffinate of the same quality. Examples 1 and 3, to be described in the following, illustrate this increase very well. In fact, the unit of Example 3, in which the rings and stationary disks have been replaced with static mixers of an equivalent space volume and to which is connected an external decanter, makes it possible to increase raffinate production by 340% for the same concentration of aromatics and the same raffinate quality as obtained in a conventional unit.

Another option consists of utilizing the extraction unit according to the invention at a capacity equal to that of a prior-art unit of the same size. In this case, the quality of the raffinate obtained is superior to that obtained in a conventional unit.

According to one way of implementing the invention, the liquid—liquid separation is a decantation. This decantation can be carried out with different decanters, for example gravity decanters, mechanical centrifugal decanters and hydrocyclones. Preferably, the decanter used to implement the invention is a gravity type such as that marketed by Alfa-Laval, Metaleurop and General Mills.

According to another feature of the invention, the static mixers are made of an oleophobic material, such as stainless steel, which permits optimum dispersion of the light phase in the continuous phase.

The extraction column according to the invention can advantageously comprise at its lower part, as in the prior art, a coalescence zone consisting of a coalescence mat. In a unit of the prior art modified according to the invention, if the flow rates of the feedstock and of the solvent remain of the same order as those of the prior art, the coalescence of drops of the raffinate phase can be achieved without having to use a coalescence mat. In fact, the size of the drops of the light phase after passage through the static mixers is greater than that obtained in the case of a prior-art apparatus, the spontaneous coalescence of the drops thus being ensured in the lower part of the column. The operation of the unit is thereby advantageously simplified. In fact, the presence of a coalescence mat, for example consisting of a coiled mesh, requires maintenance work, particularly because said mat becomes partially plugged by solid particles contained in the feedstock and/or by coke particles formed by degradation of the solvent and/or the feedstock.

According to a particularly advantageous embodiment of the invention (see Example 3), the extract phase is removed from the bottom of the column to a decanting unit where this extract phase separates into two phases, namely an actual extract phase, which is removed, and a phase enriched in raffinate and low in aromatic compounds and solvent, called pseudoraffinate, which is recycled to the extraction column at a level below that at which the feedstock is introduced into the column. Moreover, optionally the extract phase removed at the bottom of the extraction column and the pseudoraffinate recycled to this column can respectively be cooled and heated by heat exchange to bring the temperature in the extraction column and in the decantation unit into the desired range for creating a temperature gradient which will facilitate the transfer of the light phase contained in the continuous phase.

According to another embodiment of the invention, at least one static mixer is advantageously disposed inside the extraction column to which is associated a means for liquid—liquid separation, said static mixer being disposed between the level of pseudoraffinate injection and the level of feedstock injection. Said static mixer constitutes a new type of coalescence mat which does not, however, have the drawbacks of the prior-art coalescence mats.

According to one feature of the invention, to benefit from identical flow conditions prevailing at all points of the internal space of the extraction column, the static mixer at this point has an axial transmission factor greater than or equal to that of the mixers disposed between the level of introduction of the feedstock and that of the solvent.

According to another feature, the coalescence mat in the form of at least one static mixer is made of an oleophilic material such as, for example, polypropylene, polytetrafluoroethylene, or polyethylene, thus promoting the coalescence of the drops of the raffinate phase.

The process and the apparatus according to the invention whose various variants have been presented hereinabove offer the advantage of substantially higher treatment capacity of the extraction column and higher raffinate/feedstock yields.

A definite decrease in the risk of entrainment of the drops of the raffinate phase by the extract phase can be observed for systems with a low interfacial tension, for example the furfural/vacuum distillate pair. Moreover, back-mixing is minimized and the axial channeling of the phases has disappeared. All this provides the benefit of better transverse mixing of the two phases in the static mixer zone. Moreover, the invention results in more uniform conditions for the transfer of substances from the light phase to the continuous phase.

Note, in particular, that it is possible, by means of the apparatus according to the invention, to introduce the feedstock to be treated at a distance from the bottom of the column that is less than or equal to about one fourth the column height, compared to one third this height for prior-art columns.

Finally, it is clear that the maintenance of such an extraction column is much easier than in the case of the rotary disk columns of the prior art.

DETAILED DESCRIPTION OF PREFERRED EMBODIMENTS OF THE INVENTION

Figure 2:
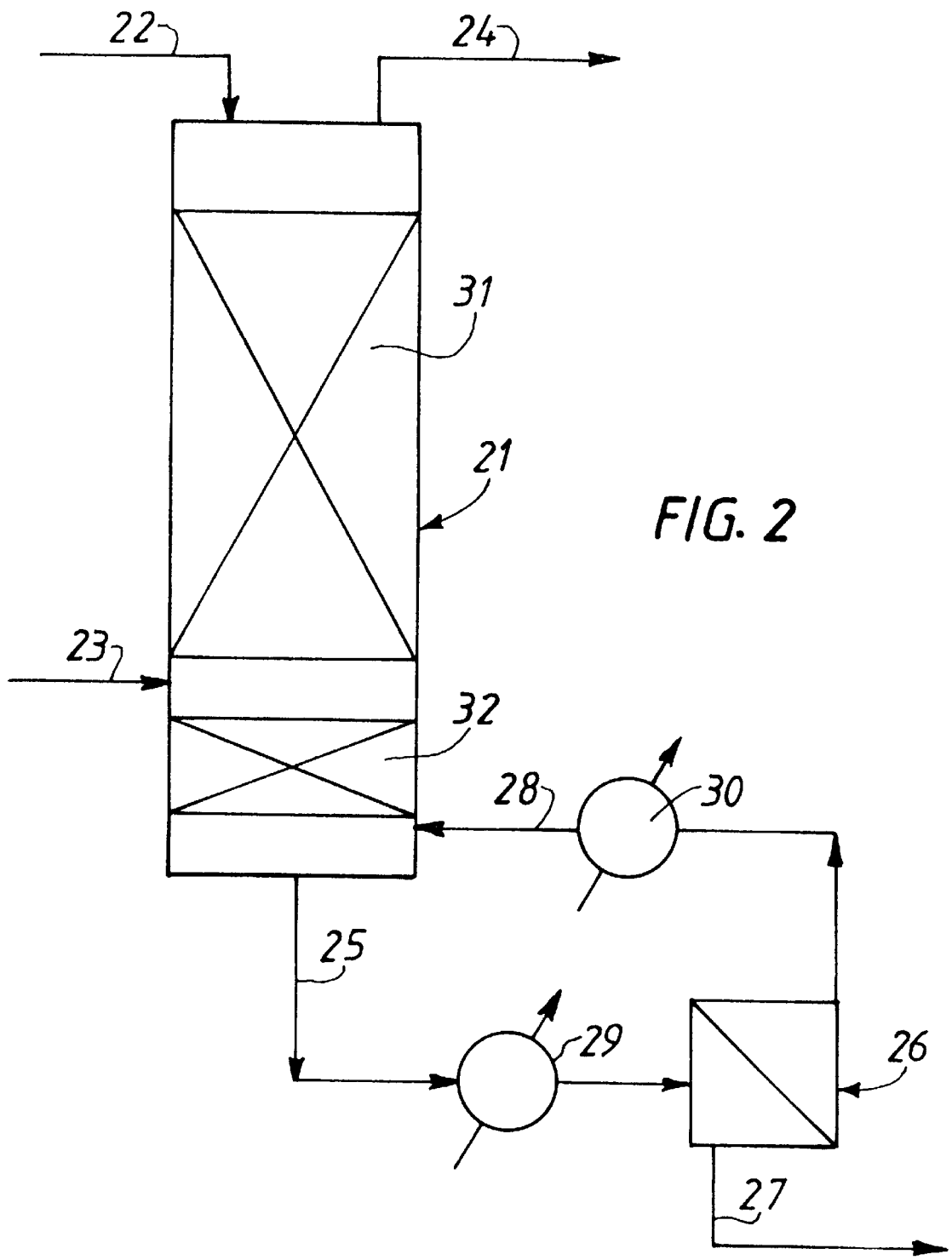
FIG. 2 is a similar view of an extraction column according to the invention.

One embodiment of the apparatus according to the invention will now be described in greater detail by reference to FIG. 2 of the attached drawings.

This figure shows an extraction column 21 provided at its upper part with a solvent feed line 22 and, at about one fourth of its height, from the bottom, with a feed line 23 for the feedstock to be treated.

The raffinate phase is removed at the top of the column through line 24, whereas the extract phase is removed at the bottom of the column through line 25. According to the invention, at least part of the internal volume of column 21, located between the level of injection of the solvent and that of the feedstock, contains packing elements 31 consisting of static mixers, for example those marketed under the name SMV by Sulzer or those marketed by Kenics and Alfa-Laval.

These packing elements promote contact and, hence, mass transfer between the two phases. Moreover, their axial transmission factor is very high, for example about 90% for Sulzer's SMV static mixers, which thus contributes to an increase in the specific flow rates of the feedstock and the solvent.

To restrict the volume of column 21 in the space below the level of injection of the feedstock, a volume which is usually limited at its upper part by a coalescence mat and which is intended to permit the drops of the dispersed light phase to coalesce, it is preferred, in the embodiment of the invention illustrated by FIG. 2, to remove the extract phase from the bottom of the column to an external decantation system. Said extract phase thus passes through line 25 to a decanter 26 in which it remains for a sufficiently long time, for example for at least 20 minutes, to permit separation into an extract phase essentially depleted of raffinate, which phase is removed through line 27 to a solvent recovery circuit, and a phase rich in raffinate and impoverished in solvent, termed a pseudoraffinate, which latter is re-injected through line 28 into the bottom of column 21.

Lines 25 and/or 28 are provided with heat exchangers 29 and 30, respectively, whereby it is possible to lower the temperature of the extract phase at the exit from the column and to raise the temperature of the pseudoraffinate phase recycled to the column. The temperature in decanter 26 is about 50° C.

To optimize to the maximum the coalescence of the drops of the raffinate phase that may not have become part of the pseudoraffinate phase during external decantation, packing elements 32 of the static mixer type may also be provided in the column between the level of injection of the pseudoraffinate phase (28) and that of the feedstock (23).

EXAMPLES

The following examples, which are not limiting in nature, are intended to illustrate the implementation of the invention and its advantages.

Example 1

A vacuum distillate having a viscosity of 32.8 and 5.15 centistokes (mm$^2$/s) at 40 and 100° C., respectively, and a density of 0.915 kg/L at 15° C. was treated in a furfural extraction column. This distillate had an aromatics content of 57%.

The column used was 19 meters high and 2.4 meters in diameter. It had in its upper zone, at a height of 8.4 m, immobile centered disks 1.2 m in diameter disposed between rings with an annular diameter of 1.7 m adjoining the side walls. The disks and the rings were evenly spaced, with a 0.15 m gap between a disk and a ring.

The feedstock was introduced into the column at a distance of 8.9 m from the bottom at a temperature of about 85° C. and a specific flow rate of 8.5 m$^3$/h/m$^2$, whereas the furfural was introduced at the top of the column at a temperature sufficient to maintain 100° C. at the top of the extraction column.

The specific flow rate of the solvent was about 14.5 m$^3$/h/m$^2$, corresponding to a ratio of solvent flow rate to feedstock flow rate (solvent proportion) of 1.70 vol./vol. and to a total specific flow rate (hydraulic capacity of the extractor) of 23 m$^3$/h/m$^2$.

Below the disks and the rings, part of the descending phase was withdrawn at a ratio of withdrawal flow rate to solvent flow rate of 1 vol./vol. Outside the column, the withdrawn phase was cooled by heat exchange to about 45° C. and then re-injected just below the level of withdrawal at about 5.3 m from the bottom. In this manner, a temperature gradient of 40° C. was created between the feedstock inlet and the bottom of the column.

To optimize the impoverishment of the extract phase in drops of raffinate phase in the lower zone of the column, a coalescence mat consisting of a metallic wire coil 60 cm high was disposed at a level of 4.3 m from the bottom of said column and across its entire cross-section (increasing the drop size of the raffinate phase).

The raffinate phase was recovered at the top of the column, and the extract phase was removed at the bottom of the column.

Under the afore-described conditions, the extraction gave a raffinate/feedstock yield of 61 wt % or a production of 515 met. tons of raffinate/day. The raffinate had a viscosity of 30 centistokes at 40° C. and a viscosity index of 95. The aromatics content of the raffinate was 35.5%.

Example 2

The same feedstock as in Example 1 was treated in a column containing SMV-type static mixers marketed by SULZER. The static mixers occupied a position and a space identical to those occupied by the disks and rings in Example 1. Also, the position and the structure of the coalescence mat were identical to those of the mat of Example 1.

The temperature conditions and the positions of introduction, withdrawal, re-injection and removal of the raffinate phase and extract phase were identical to those used in Example 1.

The feedstock was introduced at a specific flow rate of 30 m$^3$/h/m$^2$, whereas the furfural was introduced at a specific flow rate of 51 m$^3$/h/m$^2$, corresponding to a ratio of solvent flow rate to feedstock flow rate (solvent proportion) of 1.70 vol./vol. and to a total specific flow rate of 81 m$^3$/h/m$^2$.

The raffinate phase was recovered at the top of the column and the extract phase was removed at the bottom of the column.

The extraction gave a raffinate/feedstock yield of 51% at substantially the same aromatics concentration and the same raffinate quality as in Example 1, yielded a production of 1520 met. tons per day, corresponding to a production increase of 195%.

Example 3

The same feedstock as in Example 1 was treated by a process and in an apparatus according to the invention.

The same column, 19-m high and 2.4 m in diameter, was used. It was fitted over a height of 17 m with static mixers of the SMV type, marketed by SULZER.

The feedstock was introduced at a distance of 4 m from the bottom of the column at a temperature of about 100° C. and a specific flow rate of 35 m$^3$/h/m$^2$. The solvent was introduced at the top of the column at a specific flow rate of 46 m$^3$/h/m$^2$ or at a solvent to feedstock ratio of 1.31 vol./vol. and a total specific flow rate of 81 m$^3$/h/m$^2$. The temperature of the solvent was about 100° C. at the top of the column and was maintained at this value down to the point of feedstock introduction (isothermal conditions).

The two-phase mixture, obtained after the feedstock had passed through the static mixers countercurrently to the solvent, was removed from the bottom of the column at a temperature of about 50° C., regulated by heat exchange. The residence time in the decanter was about 20 minutes.

The extract phase thus depleted of raffinate was removed from the decanter to a solvent recovery circuit. The light phase called pseudoraffinate was re-introduced at the bottom of the column at a temperature of about 85° C. thus ensuring a slight gradient (15° C.) between the feedstock feeding point and the bottom of the column.

The raffinate phase was recovered from the top of the column.

This extraction process gave a raffinate/feedstock yield of about 65% or a production of 2260 met. tons of raffinate per day at an aromatics concentration and raffinate quality essentially identical to those obtained in Example 1. This corresponds to a 340% increase in raffinate production compared to that obtained by the prior-art technique described in Example 1 and to a 50% increase in raffinate production compared to that obtained in Example 2.

Example 3 illustrates the improvements in the technique of extraction of aromatic compounds from hydrocarbon feedstocks. The yield and the raffinate production are considerably improved without impairing product quality. Moreover, the apparatus and the process according to the invention use smaller quantities of solvent for treating the feedstock, leading to a solvent/feedstock ratio 20–35% (about 23% in Example 3) lower than that of the prior art, thus providing substantial savings in the application of the extraction process, particularly as regards the quantity of solvent required for the operation of the extraction unit.

Note that the process and the apparatus according to the invention are not limited to the extraction of aromatic compounds from a hydrocarbon feedstock, but that they can also be used for the extraction of other hydrocarbon impurities.

We claim:

1. A process for extracting a first-liquid comprised of liquid aromatic compounds from a second-liquid comprised of a liquid hydrocarbon feedstock, comprising:

bringing said second-liquid and a third-liquid into intimate countercurrent contact with each other and in contact with at least one static mixer element comprised of structural packing elements having an axial transmission factor of about 90% in an extraction zone to thereby form immiscible phases,
   wherein the third-liquid is comprised of a solvent which is immiscible with the second-liquid except for being capable of extracting the aromatic compounds;

subsequently separating the immiscible phases to thereby produce a raffinate phase impoverished in aromatic compounds and an extract phase rich in the solvent and the aromatic compounds;

separating by liquid—liquid separation downstream of the extraction zone at least part of the extract phase rich in the solvent and the aromatic compounds, yielding a solvent rich phase essentially depleted of raffinate, and a raffinate rich phase impoverished in solvent; and, recycling the raffinate rich phase impoverished in solvent to the extraction zone.

2. In a process for extracting a first-liquid comprised of liquid aromatic compounds from a second-liquid comprised of a liquid hydrocarbon feedstock, comprising:

bringing said second-liquid and a third-liquid into intimate countercurrent contact with each other in an extraction zone to thereby form immiscible phases, subsequently separating the immiscible phases to thereby produce a raffinate phase impoverished in aromatic compounds and an extract phase rich in the solvent and the aromatic compounds;

wherein the improvement comprises:

the third-liquid being comprised of a solvent which is immiscible with the second-liquid except for being capable of extracting the aromatic compounds;

the bringing into intimate countercurrent contact of the second- and third-liquids includes bringing the second- and third-liquids in contact with at least one static mixer element comprised of structural packing elements having an axial transmission factor of about 90% in the extraction zone;

separating by liquid—liquid separation downstream of the extraction zone at least part of the extract phase rich in the solvent and the aromatic compounds, yielding a solvent rich phase essentially depleted of raffinate, and a raffinate rich phase impoverished in solvent; and, recycling the raffinate rich phase impoverished in solvent to the extraction zone.

3. Process according to claim 1, wherein the liquid—liquid separation is carried out by decantation outside said extraction zone.

4. Process according to claim 1, wherein the raffinate-rich phase impoverished in solvent is cooled by heat exchange before being recycled to the extraction zone.

5. Process according to claim 1, wherein the third-liquid solvent is furfural and has a greater density than the feedstock.

6. Process according to claim 5, wherein the furfural and feedstock are introduced at about 100° C., the extract phase rich in solvent and aromatics is separated by liquid—liquid separation at about 50° C., and the raffinate rich phase impoverished in solvent is recycled to the extraction zone at about 85° C.

7. Process according to claim 1, wherein the third-liquid solvent serves as a continuous phase wherein feedstock drops are dispersed therein in the form of an emulsion.

* * * * *